United States Patent
Luther et al.

(10) Patent No.: US 7,036,993 B2
(45) Date of Patent: **\*May 2, 2006**

(54) PIN RETAINER FOR FIBER OPTIC CONNECTOR AND ASSOCIATED FABRICATION METHOD

(75) Inventors: James P. Luther, Hickory, NC (US); Michael deJong, Ft. Worth, TX (US); Robert B. Elkins, II, Hickory, NC (US); Otto I. Szentesi, Hickory, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 70 days.

This patent is subject to a terminal disclaimer.

(21) Appl. No.: 10/747,581

(22) Filed: Dec. 29, 2003

(65) Prior Publication Data

US 2004/0152354 A1 Aug. 5, 2004

Related U.S. Application Data

(63) Continuation-in-part of application No. 09/878,566, filed on Jun. 11, 2001, now Pat. No. 6,669,377.

(51) Int. Cl.
*G02B 6/36* (2006.01)

(52) U.S. Cl. ............... 385/53; 385/64; 385/78; 385/88; 385/92

(58) Field of Classification Search ............ 385/53, 385/70, 72, 78, 82, 88, 92, 64
See application file for complete search history.

(56) References Cited

U.S. PATENT DOCUMENTS

| | | | |
|---|---|---|---|
| 5,664,039 A | 9/1997 | Grinderslev et al. | 385/65 |
| 6,450,697 B1 * | 9/2002 | Ngo | 385/78 |
| 6,505,976 B1 | 1/2003 | Grois et al. | 385/78 |
| 6,669,377 B1 * | 12/2003 | Barnes et al. | 385/78 |
| 2001/0007603 A1 * | 7/2001 | Sakurai et al. | 385/60 |
| 2002/0186932 A1 | 12/2002 | Barnes et al. | |
| 2003/0095754 A1 * | 5/2003 | Matsumoto et al. | 385/86 |

FOREIGN PATENT DOCUMENTS

| | | |
|---|---|---|
| EP | 0271721 A2 | 11/1987 |
| EP | 0800100 A1 | 10/1997 |
| EP | 0973051 A1 | 1/2000 |

\* cited by examiner

*Primary Examiner*—Michelle Connelly-Cushwa
*Assistant Examiner*—James D. Stein
(74) *Attorney, Agent, or Firm*—Christopher C. Dremann

(57) ABSTRACT

A pin retainer for a fiber optic connector includes a ferrule having a front face defining a hole for receiving a guide pin. The pin retainer permits the guide pin to be inserted in the field following assembly of the connector and polishing the front face of the ferrule. The pin retainer includes a frame and at least one retaining tab for engaging the guide pin when the guide pin is inserted into the hole from the front face. The frame may have an open side for permitting the pin retainer to be fabricated using a highly efficient wire EDM process. The pin retainer provides a pin retention force of at least about 8 lbs and may include a plurality of retaining tabs for engaging the guide pin in more than one location. The ferrule may be provided with an external feature to position the pin retainer on the ferrule.

28 Claims, 9 Drawing Sheets

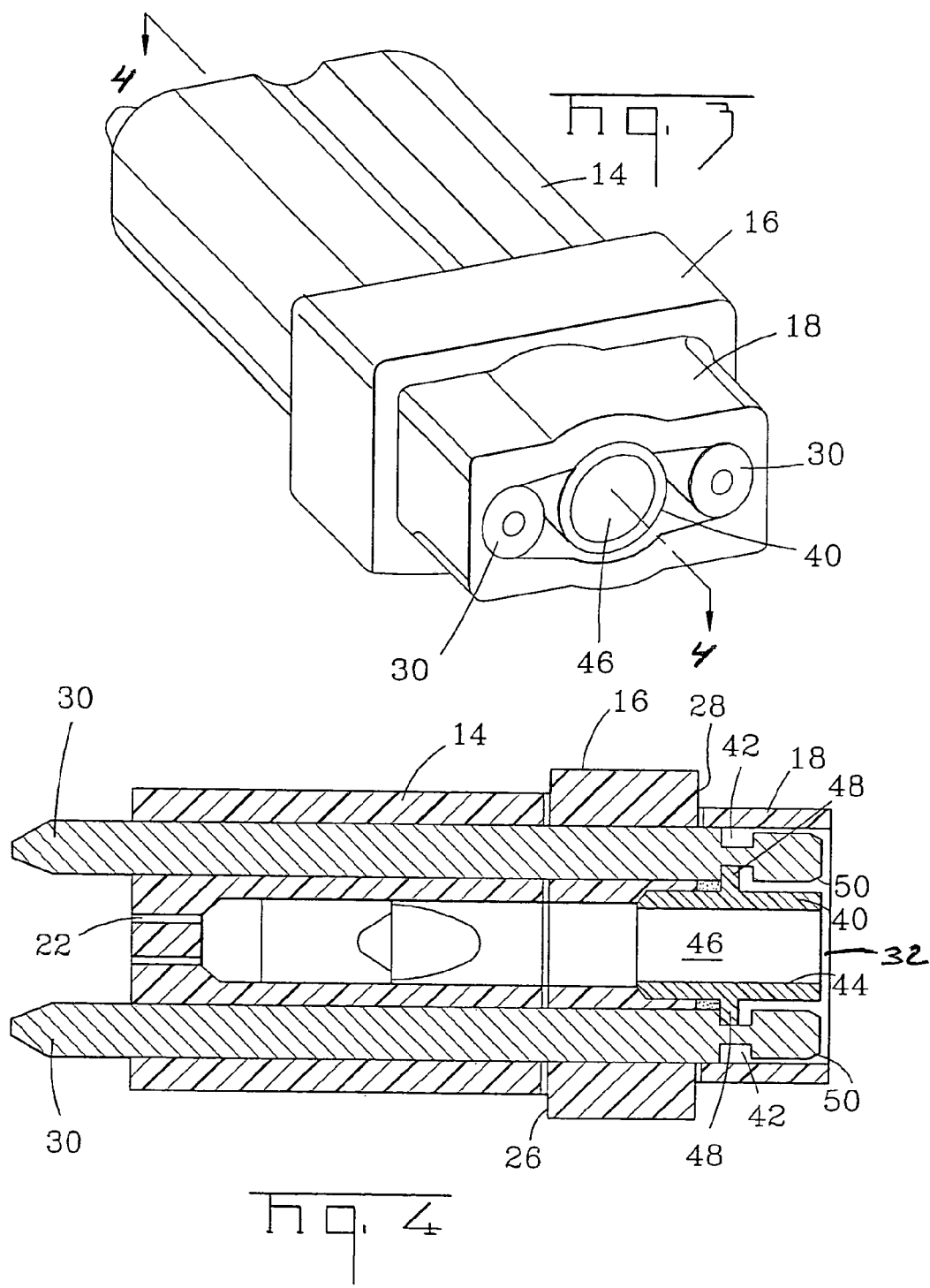

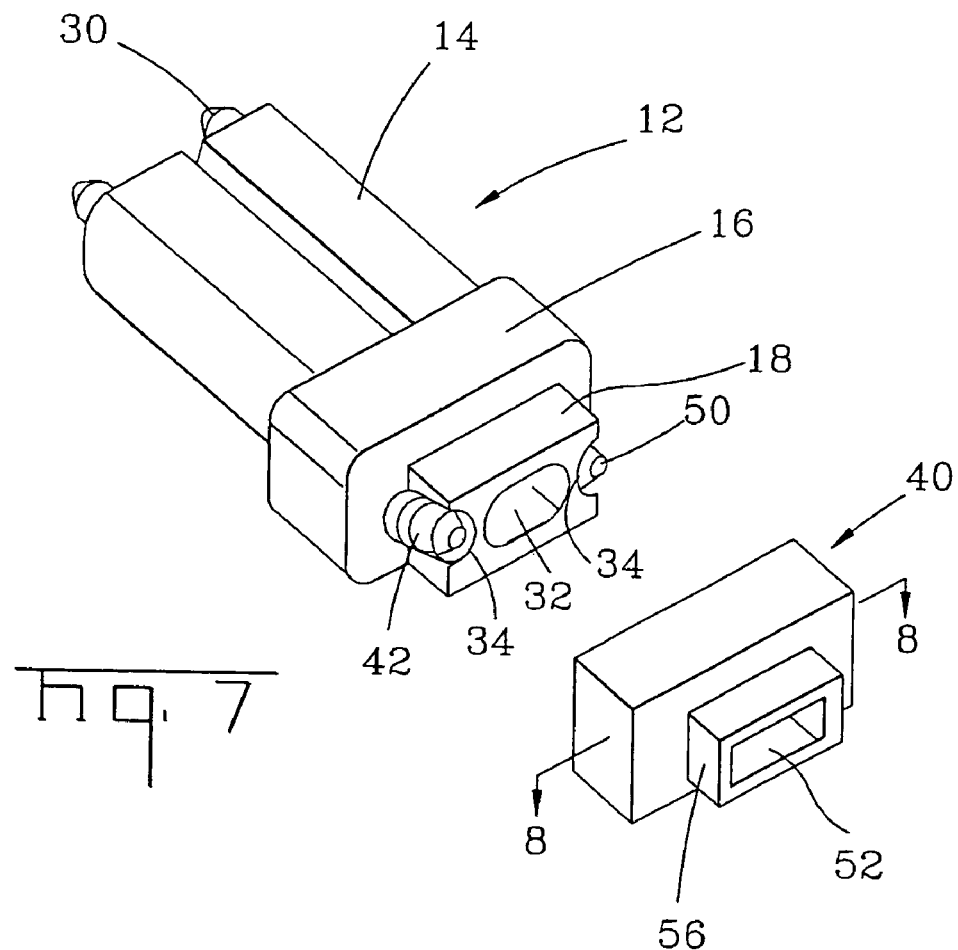
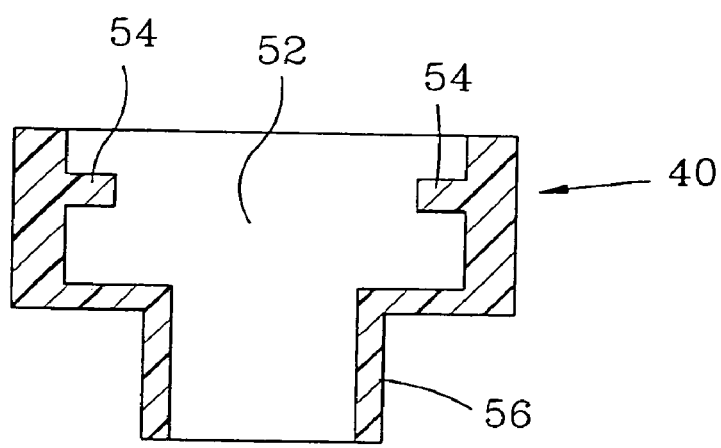
fig. 7
fig. 8

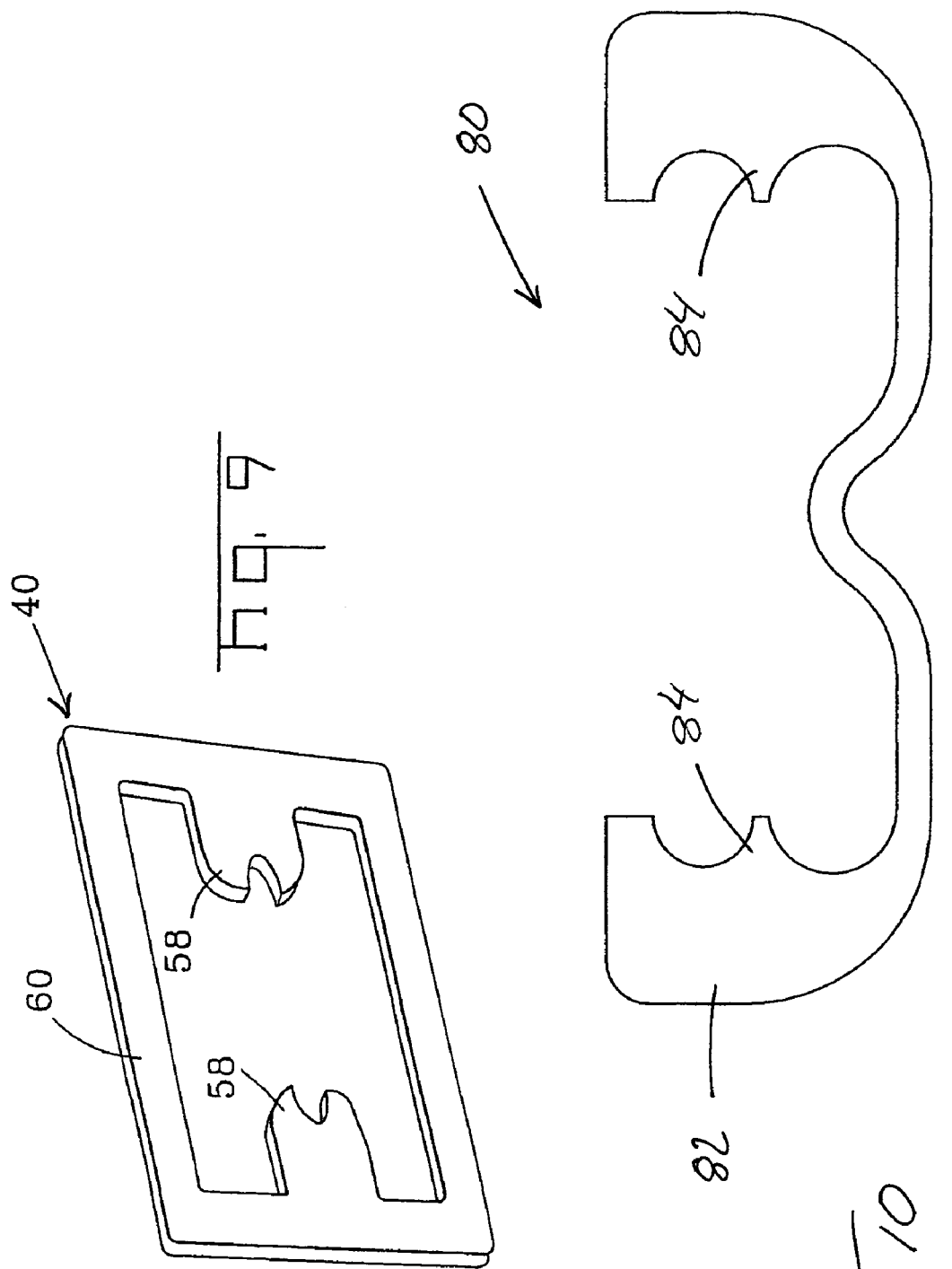

PIN RETAINER FOR FIBER OPTIC CONNECTOR AND ASSOCIATED FABRICATION METHOD

CROSS REFERENCE TO RELATED APPLICATIONS

This application is a continuation-in-part of U.S. patent application Ser. No. 09/878,566, filed Jun. 11, 2001 which issued as U.S. Pat. No. 6,669,377 on Dec. 30, 2003.

FIELD OF THE INVENTION

The present invention relates generally to a guide pin retainer for a fiber optic connector and an associated fabrication method. More particularly, the invention relates to a generally planar guide pin retainer for a fiber optic connector that permits the guide pins to be inserted into the connector after assembling the connector and polishing the front face of the ferrule without disassembling the connector, and an associated method of efficiently fabricating the guide pin retainer.

BACKGROUND OF THE INVENTION

Multi-fiber cables or ribbons are being increasingly employed in a wide variety of applications. As such, several standard multi-fiber connectors have been developed and are commonly utilized. Perhaps the most common multi-fiber connector is the MT-RJ connector having a rectangular-shaped, miniature MT ferrule that was developed by Nippon Telegraph & Telephone Corporation of Tokyo, Japan. An MT-RJ connector is commonly assembled utilizing a heat cure epoxy process. In this regard, epoxy is introduced via a window defined by the mini-MT ferrule into the bores defined by the mini-MT ferrule through which the end portions of the within the ferrule. The front face of the ferrule is then polished, and the remainder of the MT-RJ connector is assembled around the pre-assembled and polished mini-MT ferrule.

With respect to the assembly of the remaining components of the MT-RJ connector, the mini-MT ferrule is mounted within a connector housing such that the front face of the ferrule is exposed. In this regard, the mini-MT ferrule includes a lengthwise extending shank and an enlarged shoulder portion proximate the rearward end of the shank. The shoulder portion is larger in lateral cross-section than the shank, thereby defining the shoulder. Upon insertion of the mini-MT ferrule into the connector housing during the assembly of an MT-RJ connector, the shoulder of the ferrule is engaged by an inwardly projecting ledge within the connector housing such that the front face of the ferrule extends outwardly beyond the connector housing, while the enlarged shoulder portion of the ferrule is retained within the connector housing. Thus, a mini-MT ferrule must include an enlarged shoulder portion to define a shoulder for engaging the connector housing.

Another common multi-fiber connector is the MT-RJ UniCam® connector available from Corning Cable Systems LLC of Hickory, N.C. The MT-RJ UniCam® connector has a modified MT ferrule referred to as the E-ferrule. The UniCam® connector can be mounted upon one or more optical fibers by means of a cam actuated mechanical splice component that permits the UniCam® connector to be field installable. In this regard, fiber stubs are typically mounted within respective bores defined by the F-ferrule. The fiber stubs are secured within the ferrule by means of an epoxy, and the front face of the ferrule is then polished. The steps of mounting the F-ferrule upon one or more fiber stubs and polishing the front face of the ferrule are performed under controlled manufacturing and assembly conditions in the factory, and the fiber stubs of the UniCam® connector are thereafter spliced onto one or more optical fibers deployed in the field. In this regard, the UniCam® connector also includes a splice component holder that engages the rearward end of the ferrule. The splice component holder defines a lengthwise extending passageway that is sized and shaped to receive a pair of splice components. The splice components define lengthwise extending grooves for receiving end portions of the fiber stubs and the optical fibers in the field. In particular, the fiber stubs upon which the ferrule is mounted extend into the grooves defined by the splice components from one end, while the optical fibers deployed in the field are inserted into the grooves defined by the splice components from the other end. By rotating a cam member relative to the splice component holder, the splice components are forced together, thereby mechanically splicing the stub fibers to the field optical fibers. Since the E-ferrule must be engaged by the splice component holder in order to ensure alignment of the stub fibers and the field optical fibers, the E-ferrule generally has a different design than the MT ferrule utilized by MT-RJ connectors. Rather than an enlarged shoulder, the E-ferrule has a reduced shoulder portion. As such, the portion of the passageway defined by the splice component holder proximate its forward end is sized and shaped to snugly receive the rearward end of the E-ferrule so that the E-ferrule and the splice component holder are maintained in an aligned relationship.

In addition to the MT-RJ connector and the MT-RJ UniCam® connector, another common multi-fiber connector is the MTP or MPO connector (hereinafter collectively referred to as the MTP connector). The MTP connector has a larger version of the MT ferrule than the MT-RJ connector and can therefore be mounted upon the end portions of a larger number of optical fibers than the MT-RJ connector. As with the MT-RJ connector, however, an MTP connector is commonly assembled by a heat cure epoxy process. In this regard, epoxy is introduced via a window defined by the MT ferrule into the bores defined by the MT ferrule through which the end portions of the optical fibers extend. The epoxy is heat cured to secure the end portions of the optical fibers within the MT ferrule. The front face of the MT ferrule is then polished, and the remainder of the MTP connector is assembled around the pre-assembled and polished ferrule.

Regardless of the type of multi-fiber connector, the connector should be capable of receiving guide pins in order to facilitate the alignment of the multi-fiber connector with another multi-fiber connector or with an optical interface device. The alignment of the multi-fiber connectors, in turn, permits alignment of the optical fibers upon which the connectors are mounted. Depending upon the type of multi-fiber connector, different guide pin retention mechanisms have been developed. With respect to the MT-RJ and MTP connectors, for example, two different configurations have been developed, namely, a male configuration that includes a pair of guide pins extending outwardly beyond the front face of the MT ferrule and a female configuration that does not include guide pins but that defines a pair of guide pin holes. A respective pair of male and female connectors is therefore mated by inserting the guide pins of a male connector into the guide pin holes of a female connector.

In order to retain the guide pins in the male configuration of the MT-RJ or MTP connector, each connector generally includes a pin keeper. During the assembly process, the guide pins are engaged by the pin keeper prior to the insertion of the guide pins into a ferrule. The pin keeper is then positioned immediately rearward of the MT ferrule with the guide pins inserted through the guide pin holes defined by the MT ferrule from the rear of the MT ferrule so as to protrude outwardly beyond the front face of the MT ferrule. Thus, the guide pins of the male configuration of an MT-RJ or MTP connector must be inserted during the pre-assembly of the ferrule in the factory and cannot be inserted in the field once the remainder of the connector has been assembled around the ferrule. As a result, the female configuration of an MT-RJ or MTP connector cannot be converted to a male configuration in the field by merely inserting guide pins through the guide pins holes defined by the MT ferrule since the guide pins will not be appropriately grasped by the pin keeper. Field technicians must therefore maintain an inventory of MT-RJ and/or MTP connectors in both the male configuration and the female configuration since the connectors cannot be converted in the field, without dissembling the connector.

Generally, MT-RJ and MTP connectors also cannot be pre-assembled. Instead, the MT-RJ and MTP connectors can only be assembled once the MT ferrule has been mounted upon the optical fibers and the front face of the MT ferrule has been polished since the guide pins of the male configuration of the connector would otherwise protrude beyond the front face of the ferrule and prevent polishing. Additionally, the MT ferrule is typically secured to the optical fibers by means of epoxy injected through a window defined by MT ferrule, thereby also preventing pre-assembly of the connector since the window must remain accessible until the optical fibers have been secured within the MT ferrule. Thus, the MT ferrule is mounted upon a plurality of optical fibers, the front face of the MT ferrule is polished, the guide pins are inserted into the guide pin holes from the rear of the ferrule for the male configuration, and the remainder of the connector is thereafter assembled. In contrast, a UniCam® connector with an E-ferrule permits the guide pins to be inserted from the front side after the front face of the E-ferrule has been polished. In this regard, the guide pins can be inserted into corresponding guide pin holes. The guide pins are then glued to the ferrule by means of epoxy injected via a pair of relatively small windows. Unfortunately, the process of gluing the guide pins to the E-ferrule is a time-consuming operation and must be carefully performed to prevent any epoxy from reaching the front face of the ferrule.

Accordingly, while various guide pin retainers have been developed for different multi-fiber connectors, an improved guide pin retainer is desired. In this regard, it would be desirable for a multi-fiber connector to be capable of being converted from a female configuration to a male configuration in the field in order to reduce the number of different connectors that a field technician must maintain in inventory. As such, it would be desirable for a multi-fiber connector to permit guide pins to be inserted from the front face of the ferrule and engaged by a guide pin retainer following assembly of the multi-fiber connector and polishing of the front face of the ferrule. Additionally, it would be desirable for a multi-fiber connector to include a guide pin retainer that permits guide pins to be inserted and engaged without the use of epoxy or the like.

SUMMARY OF THE INVENTION

A pin retainer for a fiber optic connector including a multi-fiber ferrule is provided by the present invention that is suitable for a variety of different ferrules. The pin retainer permits guide pins to be inserted in the field following assembly of the connector and polishing of the front face of the ferrule, without requiring that the connector be disassembled or that the guide pins be adhered to the ferrule by means of epoxy or the like. Thus, a field technician need not carry an inventory of both male connectors and female connectors, but can instead carry only female connectors and a supply of guide pins in order to convert the female connectors into male connectors, as needed, in the field. In certain embodiments, the pin retainer is not larger in lateral cross-section than the first shoulder portion of the ferrule and does not protrude rearward beyond the ferrule. In other embodiments, the pin retainer generates a pin retention force that preferably exceeds at least about 8 lbs, and more preferably exceeds at least about 10 lbs. In yet other embodiments, the pin retainer lends itself to a wire EDM fabrication process that permits the highly efficient fabrication of a large quantity of the pin retainers in an automated manufacturing environment with little or no operator involvement. In yet other embodiments, the pin retainer engages a feature provided on the exterior of the ferrule to position the pin retainer on the ferrule such that the pin retainer does not extend rearward, or significantly rearward, beyond the ferrule.

In a ferrule in which the guide pins extend through the internal opening defined by the second shoulder portion of the ferrule, the pin retainer preferably engages the guide pins within the ferrule. In this regard, the pin retainer of one advantageous embodiment includes a body portion extending lengthwise between opposed ends and defining a passageway opening through each of the opposed ends. The body portion is sized to be at least partially and, more preferably, completely received within an internal opening defined by the ferrule. The pin retainer of this embodiment also includes at least one and, more typically, a plurality of engagement members extending laterally outward from the body portion for engaging respective guide pins within the ferrule. For example, the pin retainer typically includes a pair of engagement members extending laterally outward from opposite sides of the body portion. Typically, the engagement members extend laterally outward from a midpoint of the body portion such that the pin retainer is symmetrical about an imaginary plane passing through the pair of engagement members.

The guide pins typically include circumferential grooves. As such, the pin retainer is preferably designed such that the engagement members can snap within the groove of a respective guide pin as the guide pin is inserted through holes defined by the shank and the first shoulder portion of the ferrule. In order to facilitate the insertion of the engagement members into the circumferential grooves defined by the guide pins, each engagement member can taper laterally outward, if so desired. As such, the guide pins can be advantageously inserted following the assembly of the fiber optic connector and polishing of the front face of the ferrule.

Since the pin retainer is sized and shaped to fit within the ferrule, the combination of the ferrule and the pin retainer is preferably no larger than the ferrule by itself. As such, the ferrule and the pin retainer can be assembled within a conventional connector housing without restricting or otherwise limiting the length or the lateral cross-sectional dimensions of the ferrule.

In embodiments of the fiber optic connector in which the plurality of guide pins extend along an exterior surface of the second shoulder portion, the fiber optic connector can include other types of pin retainers for engaging the guide pins as the guide pins are inserted through the guide pin holes following the assembly of the connector. For example, the fiber optic connector can include a pin retainer defining an opening sized and shaped to receive the second shoulder portion and end portions of the guide pins such that the second shoulder portion can be inserted into the opening defined by the pin retainer. The guide pins will therefore be secured between the pin retainer and the second shoulder portion. In this embodiment, the pin retainer typically includes a plurality of retaining tabs extending into the opening defined by the pin retainer for engaging the circumferential grooves defined by the respective guide pins. In one embodiment, the pin retainer includes a plurality of retaining tabs for engaging respective guide pins proximate the second shoulder portion. In this embodiment, the pin retainer can also include a closed frame connecting the plurality of retaining tabs and defining an opening for receiving a second shoulder portion. In both embodiments, however, the pin retainer is preferably no larger in lateral cross-section than the first shoulder portion such that the resulting combination of the ferrule and the pin retainer can be disposed within a conventional connector housing.

In other embodiments, the frame is open on one side to permit the pin retainer to be fabricated using a highly efficient wire electrical discharge machining (EDM) process. As a result, a plurality of sheets of stock material can be stacked together to simultaneously produce a corresponding plurality of the pin retainers in a continuous manner without the need to disengage and relocate the wire inside the frame of the pin retainer. Accordingly, the process can be automated and require little or no operator involvement. In one embodiment, the frame is generally C-shaped and defines a C-clip pin retainer having at least one retaining tab for engaging the guide pin when it is inserted from the front face of the ferrule. The pin retainer may be inserted during assembly of the connector into a groove provided in the ferrule between the first shoulder portion and the second shoulder portion. The ferrule may be further provided with structure for permitting the pin retainer to be removed, for example using an external tool, in the event that the guide pins need be removed or replaced after insertion into the ferrule. In another embodiment, the frame further includes at least one flexure arm disposed opposite the retaining tab for engaging the guide pin in more than one location. In yet another embodiment, the frame is generally E-shaped and defines an E-clip pin retainer having at least a pair of opposing retaining tabs for engaging the guide pin on opposite sides in a symmetrical manner. The frame and the retaining tabs are preferably configured to generate a pin retention force of at least about 8 lbs, and more preferably, at least about 10 lbs.

In yet another embodiment, the frame of the pin retainer includes a rear face, a pair of outer walls depending forwardly from the rear face, and a pair of opposing forward edges depending inwardly from the outer walls. The ferrule is preferably provided with an external feature, for example between the shank and the first shoulder portion, for positioning the pin retainer on the ferrule in a desired location. The lateral cross-section of the pin retainer may be slightly larger than the lateral cross-section of the ferrule and the pin retainer may extend slightly rearward beyond the ferrule. However, the second shoulder portion may be eliminated in this embodiment and the pin retainer is retained on the ferrule by the external feature so that the pin retainer is not retained between the ferrule and, for example, a spring push in an assembled fiber optic connector.

An improved guide pin retainer for a fiber optic connector according to the present invention permits guide pins to be inserted following the assembly of the connector and the polishing of the front face of the ferrule. Thus, the pin retainer permits guide pins to be inserted in the field from the front face of the ferrule in order to convert a female configuration of a fiber optic connector to a male configuration, thereby reducing the inventory of different fiber optic connectors that must be carried by a field technician. Moreover, pin retainers according to the present invention are no larger in cross-sectional dimensions than the ferrule and do not extend rearward beyond the ferrule. Furthermore, pin retainers according to the invention generate a pin retention that preferably exceeds at least about 8 lbs, and more preferably, at least about 10 lbs. Still further, pin retainers according to the present invention are capable of being fabricated by a highly efficient wire EDM process that permits a large quantity of the pin retainers to be produced in an automated environment with little or no operator involvement. Finally, pin retainers according to the present invention may be positioned on a feature that may be machined, but preferably is molded, onto an exterior surface of the ferrule.

BRIEF DESCRIPTION OF THE DRAWINGS

FIG. 3 is a perspective view of the ferrule of FIG. 1 taken from the rearward end of the ferrule following the insertion of the pin retainer and a pair of guide pins.

FIG. 4 is a cross-sectional view of the ferrule, the pin retainer and the guide pins of FIG. 3 taken along line 4—4.

FIG. 7 is a perspective view of a ferrule and a pin retainer according to yet another embodiment of the present invention.

FIG. 8 is a cross-sectional view of the pin retainer of FIG. 7 taken along line 8—8.

FIG. 9 is an enlarged perspective view of a pin retainer according to yet another embodiment of the present invention.

FIG. 10 is an enlarged plan view of a pin retainer according to yet another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to the present invention, a guide pin retainer for a fiber optic connector is provided that permits guide pins to be inserted into the connector after assembling the connector and polishing the front face of the ferrule without disassembling the connector. By way of example and not by way of limitation, various embodiments of such a guide pin retainer are shown and described. An associated method of efficiently fabricating the guide pin retainer is also provided.

Figure 1:
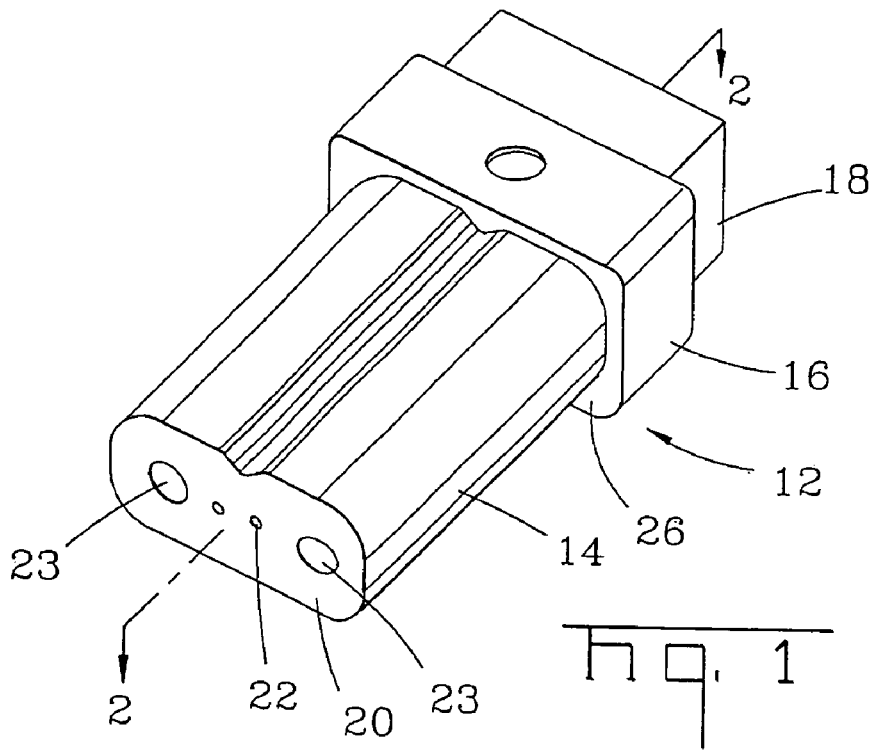
FIG. 1 is a perspective view of a ferrule for receiving a pin retainer according to the present invention.

As shown in FIG. 1, a multi-fiber ferrule, indicated generally at 12, includes a shank 14 and first and second shoulder portions 16, 18. The multi-fiber ferrule 12 including the shank 14 and the first and second shoulder portions 16, 18 is preferably a monolithic structure formed of a thermoset epoxy material or a thermoplastic material. The shank 14 extends lengthwise between opposed first and second ends and has a front face 20 proximate the first end. The shank 14 can have a rectangular shape in lateral cross section in order to have the same appearance as a mini-MT ferrule. However, the shank 14 can also have other shapes in lateral cross section including the shape depicted in FIG. 1 in which the shank has a pair of lobes extending in parallel and connected to one another along their length.

The shank 14 defines at least one and, more typically, a plurality of lengthwise extending bores 22. The bores 22 open through the front face 20 of the shank for receiving end portions of respective optical fibers. The shank 14 also defines a plurality of lengthwise extending holes 23. As shown in FIG. 1, the shank 14 typically defines a pair of holes 23. These holes 23 also open through the front face 20 of the shank 14 and are adapted to receive respective guide pins 30 which serve to align the multi-fiber ferrule 12 with another multi-fiber ferrule, an optical interface device, or the like.

The first shoulder portion 16 of the ferrule 12 of FIG. 1 is proximate the second end of the shank 14 and is larger in lateral cross-section than the shank. Although the ferrule 12 can be sized and shaped in different manners without departing from the present invention, the ferrule of one embodiment includes a shank 14 having lateral cross-sectional dimensions of 2.45 mm×4.4 mm and a first shoulder portion 16 with lateral cross-sectional dimensions of 3.0 mm×5.05 mm. In this regard, the peripheral portion of the first shoulder portion 16 that extends laterally outward beyond the shank 14 defines a shoulder 26. As explained in detail below, the shoulder 26 is capable of engaging internal features of a connector housing of an MT-RJ or MTP connector in order to retain the multi-fiber ferrule 12 within the connector housing. As such, the shoulder 26 defined by the multi-fiber ferrule 12 permits the multi-fiber ferrule to be sized so as to be compatible with a mini-MT ferrule and a MT ferrule. As shown in cross-section in FIG. 2, the first shoulder portion 16 also defines an internal opening 28 that is in communication with the plurality of bores 22 defined by the shank 14 for receiving end portions of the optical fibers. Additionally, the first shoulder portion 16 typically defines a plurality of holes 24, preferably the same as the number of holes 23 of the shank 14, such as a pair of holes. In addition, the holes 24 defined by the first shoulder portion 16 are in communication with respective holes 23 defined by the shank 14 in order to receive respective guide pins 30 (FIGS. 3 and 4).

The second shoulder portion 18 of the multi-fiber ferrule 12 of FIG. 1 is proximate the first shoulder portion 16 and is disposed opposite the shank 14 relative to the first shoulder portion. As illustrated, the second shoulder portion 18 is smaller in lateral cross-section than the first shoulder portion 16 and may actually be smaller in lateral cross-section than the shank 14. Both the first and second shoulder portions 16, 18 define respective lateral cross-sectional profiles. Typically, the shape of the lateral cross-sectional profiles of the first and second shoulder portions 16, 18 are the same, namely, a substantially rectangular profile having rounded corners. However, the lateral cross-sectional profile of the second shoulder portion 18 has an area that is substantially less than that of the first shoulder portion 16. By way of example, the ferrule 12 of the embodiment described above having a first shoulder portion 16 with lateral cross-sectional dimensions of 3.0 mm×5.05 mm also includes a second shoulder portion 18 having lateral cross-sectional dimensions of 2.0 mm×4.0 mm.

Figure 2:
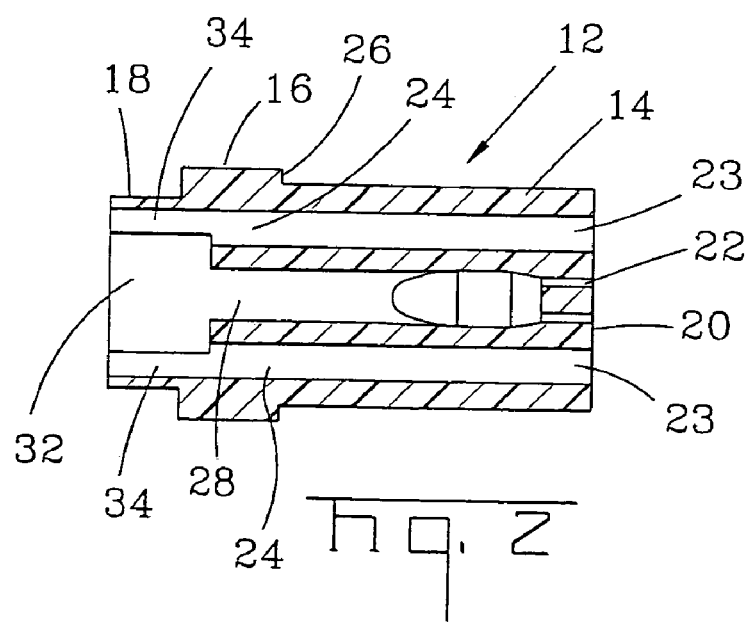
FIG. 2 is a cross-sectional view of the ferrule of FIG. 1 taken along line 2—2.

Like the first shoulder portion 16, the second shoulder portion 18 defines an internal opening 32 in communication with the internal opening 28 defined by the first shoulder portion and the bores 22 defined by the shank 14, as best shown in FIG. 2. As such, optical fibers can extend through the internal openings 28, 32 defined by the first and second shoulder portions 16, 18 and through respective bores 22 defined by the shank 14 so as to be exposed at the front face 20 of the shank. Unlike the first shoulder portion 16, however, the second shoulder portion 18 of this embodiment does not define complete holes through which respective guide pins would extend. Instead, the multi-fiber ferrule 12 of this embodiment is designed such that the guide pins 30 exit the respective holes 24 defined by the first shoulder portion 16 and extend along a surface, either the interior or exterior surface, of the second shoulder portion 18. As such, a pin retainer according to the invention can engage those portions of the guide pins 30 that extend along the second shoulder portion 18 and secure the guide pins relative to the multi-fiber ferrule 12, as explained in more detail below. In the embodiment illustrated in FIG. 2, the holes 24 defined by the first shoulder portion 16 open into the interior opening 32 defined by the second shoulder portion 18. As explained below in connection with FIGS. 3 and 4, the guide pins 30 can therefore extend beyond the holes 24 defined by the first shoulder portion 16 and along opposed interior sidewalls that define the interior opening 32 of the second shoulder portion 18.

In order to maintain the position of the guide pins 30 relative to the multi-fiber ferrule 12, the second shoulder portion 18 can define a plurality of lengthwise extending grooves 34, as shown in FIG. 2. The second shoulder portion 18 preferably defines the same number of grooves 34 as the number of guide pin holes 23, 24 defined by the shank 14 and the first shoulder portion 16, respectively, such as a pair of grooves. The grooves 34 defined by the second shoulder portion 18 are in alignment with the holes 24 defined by the first shoulder portion 16 and the holes 23 defined by the shank 14 for receiving respective guide pins 30. As such, in the embodiment in which the holes 24 defined by the first shoulder portion open into the internal opening 32 defined by the second shoulder portion 18, the interior sidewalls of the second shoulder portion preferably define a pair of lengthwise extending grooves 34 in alignment with the holes defined by the first shoulder portion for receiving respective guide pins 30. Each groove 34 is preferably sized and shaped to snugly receive a portion of a respective guide pin 30. The guide pins 30 and the multi-fiber ferrule 12 are also preferably sized such that the guide pins do not protrude rearwardly beyond the second shoulder portion 18 but, instead, terminate alongside the second shoulder portion.

In an alternative embodiment depicted in FIG. 7 and discussed in greater detail below, the holes 24 defined by the first shoulder portion 16 open on the outside of the second shoulder portion 18 such that the guide pins 30 extend along the exterior surface of the second shoulder portion. In this embodiment, the second shoulder portion 18 again defines a plurality of lengthwise extending grooves 34, such as a pair of grooves in alignment with the holes 24, 23 defined by the first shoulder portion 16 and the shank 14, respectively, for receiving respective guide pins 30. Since the holes 24 defined by the first shoulder portion 16 open outside of the second shoulder portion 18 in this embodiment, the grooves 34 extend lengthwise along the opposed exterior sidewalls of the second shoulder portion 18. As described above, the guide pins 30 and the multi-fiber ferrule 12 are again preferably sized such that the guide pins do not extend rearwardly beyond the second shoulder portion 18 but, instead, terminate alongside the second shoulder portion. As with the grooves 34 described above, each groove defined by the exterior surface of the second shoulder portion 18 of this embodiment is preferably sized and shaped to snugly receive at least a portion of a respective guide pin 30.

Regardless of the type of multi-fiber ferrule 12, the fiber optic connector includes a plurality of guide pins 30 and a pin retainer 40 for engaging the plurality of guide pins, as depicted in FIGS. 3 and 4. The guide pins 30 and the pin retainer 40 can be formed of various materials, although the guide pins 30 are typically formed of a metal, while the pin retainer 40 is generally formed either of a metal or a plastic. As is known to those skilled in the art, multi-fiber connectors typically include a pair of guide pins 30 and, as described above, the multi-fiber ferrule 12 of the present invention includes a shank 14 and a first shoulder portion 16 that define lengthwise extending holes 23, 24 for snugly receiving respective guide pins. According to the exemplary embodiments of the present invention shown and described herein, the pin retainer 40 is designed to securely engage the guide pins 30 without being positioned rearward of the multi-fiber ferrule 12 and without being any larger in lateral cross-sectional size and shape than the first shoulder portion 16. Since the pin retainer 40 will preferably not be positioned rearward of the multi-fiber ferrule 12, the ferrule can be longer than conventional MT ferrules. Additionally, since the pin retainer 40 is no larger in lateral cross section than the first shoulder portion 16, the pin retainer does not require the internal cavity defined by the connector housing to be enlarged. Instead, the fiber optic connector can include a traditional connector housing having an internal cavity of conventional size.

In certain embodiments, the pin retainer 40 is designed to engage the portions of the plurality of guide pins 30 that extend along the second shoulder portion 18. In this regard, the guide pins 30 generally define a circumferential groove 42 proximate the rearward end of the guide pins, namely, within that portion of the guide pins that extend along the second shoulder portion 18. As such, the pin retainer 40 is designed to engage the grooves 42 defined by the respective guide pins, thereby securely affixing the guide pins in position relative to the multi-fiber ferrule 12.

Figure 5:
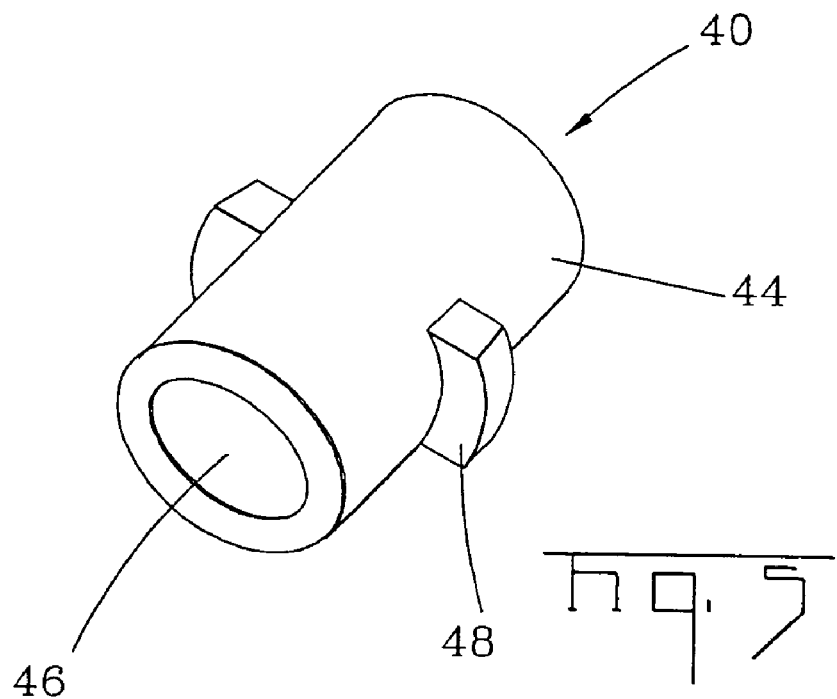
FIG. 5 is a perspective view of a pin retainer according to one embodiment of the present invention.

In an embodiment in which the guide pins 30 extend through the internal opening 32 defined by the second shoulder portion 18, the pin retainer 40 is sized and shaped to fit within at least the internal opening 32 of the second shoulder portion and, more typically, the internal opening defined by the second shoulder portion and at least some of the internal opening 28 defined by the first shoulder portion 16 (FIG. 4). As shown in FIG. 5, the pin retainer 40 of this embodiment includes a body portion 44 extending lengthwise between opposed ends. The body portion 44 is typically tubular, but could be other shapes depending upon the shape of the internal openings 28, 32 defined by the first and second shoulder portions 16, 18 since the shape and size of the body portion are typically selected to match the shape and size of the internal openings defined by the first and second shoulder portions. The body portion 44 also defines a lengthwise extending passageway 46 opening through each of the opposed ends. As such, the optical fibers can extend through the passageway 46 defined by the body portion 44 and into the bores 22 defined by the shank 14 of the ferrule 12.

The pin retainer 40 of this embodiment also includes at least one and, more typically, a plurality of engagement members 48 extending laterally outward from the body portion 44 for engaging respective guide pins 30 within the ferrule 12. Typically, the plurality of engagement members 48 extend laterally outward from the body portion 44 by a distance sufficient to be disposed within the circumferential grooves 42 defined by the respective guide pins 30 without contacting the bottom of the grooves. Although the pin retainer 40 could have a single engagement member 48 that extends circumferentially about all or a portion of the body portion 44, the pin retainer generally has the same number of engagement members as the number of guide pins 30. Thus, since the fiber optic connector typically includes a pair of guide pins 30, the pin retainer 40 also commonly includes a pair of engagement members 48 extending laterally outward from opposite sides of the body portion 44 for engaging the circumferential grooves 42 defined by the respective guide pins.

As shown in FIG. 5, the engagement members 48 extend laterally outward from a midpoint of the body portion 44. As such, the pin retainer 40 is symmetrical about an imaginary plane passing through the engagement members 48. As a result, either end of the pin retainer 40 can initially be inserted into the internal openings 32, 28 defined by the second and first shoulder portions 18, 16, respectively. In an alternative embodiment depicted in FIG. 6, however, each engagement member 48 tapers laterally outward. In this embodiment, each engagement member 48 tapers laterally outward from a first side facing one end of the body portion 44 to a second side facing another end of the body portion. The pin retainer 40 of this embodiment is therefore inserted into the internal openings 32, 28 defined by the second and first shoulder portions 18, 16 such that the engagement member 48 tapers laterally outward in a direction extending from the front face 20 of the multi-fiber ferrule 12 to the rearward end of the ferrule. As such, the tapered engagement member 48 facilitates insertion of the engagement member into the circumferential groove 42 of a respective guide pin 30. However, the pin retainer 40 of the embodiment of FIG. 5 offers a manufacturing process advantage over that of FIG. 6 since the pin retainer of FIG. 5 is orientation independent.

Figure 6:
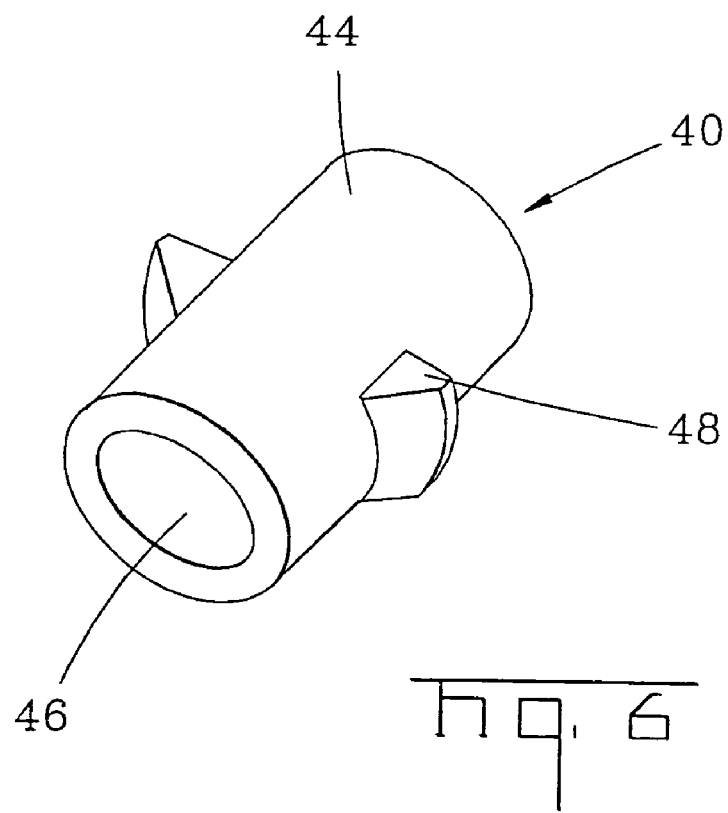
FIG. 6 is a perspective view of a pin retainer according to another embodiment of the present invention.

A fiber optic connector including the pin retainer 40 of FIG. 5 or FIG. 6 permits guide pins 30 to be inserted following the assembly of the connector and the polishing of the front face 20 of the ferrule 12. In this regard, the pin retainer 40 is inserted into the internal openings 32, 28 defined by the second and first shoulder portions 18, 16 during the assembly of the fiber optic connector. Typically, the pin retainer 40 is press fit or friction fit within the internal openings of the ferrule 12 and is held within the ferrule by means of an epoxy or the like. However, guide pins 30 are not inserted into the ferrule 12 during the initial assembly of the connector, thereby producing female versions of the connector. In instances in which it is desired to convert the female version of the fiber optic connector into the male version, the guide pins 30 are inserted into respective holes 23, 24 defined by the shank 14 and the first shoulder portion 16 and through the respective grooves 34 defined by the second shoulder portion 18. As the guide pins 30 are advanced through the grooves 34, the ends of the guide pins contact respective engagement members 48. However, the guide pins 30 preferably include a tapered or frustoconical end portion 50 (FIG. 4) to facilitate the advancement of the ends of the guide pins beyond the engagement members 48 of the pin retainer 40. The engagement members 48 of the pin retainer 40 then snap into the circumferential grooves 42 of the respective guide pins 30 so as to securely engage the guide pins and affix the guide pins in position relative to the ferrule 12. Thus, a field technician need not carry both male and female versions of the connector, but can, instead, carry only female versions of the assembled connector and a supply of guide pins 30 so as to convert female versions of the connector into male versions in the field, on an as needed basis, without disassembling the connector.

The present invention includes other types of pin retainers 40 for engaging the end portions of the plurality of guide pins 30 that extend along the second shoulder portion 18 of a fiber optic connector. As described above, however, these alternative embodiments of the pin retainer 40 are also preferably designed to have a size and shape in lateral cross-section that is no larger than the first shoulder portion 16 of the ferrule 12. Additionally, these alternative embodiments of the pin retainer 40 can further be designed so as not to be positioned rearward of the ferrule 12, for example between the ferrule and a spring or spring push. These alternative embodiments of the pin retainer 40 can also engage the portions of the guide pins 30 that extend along the exterior surface of the second shoulder portion 18.

In one alternative embodiment depicted in FIGS. 7 and 8, for example, the pin retainer 40 includes a retainer housing defining an internal opening 52 that is sized and shaped to receive both the second shoulder portion 18 of the ferrule 12 and the end portions of the guide pins 30 that extend along the exterior surface of the second shoulder portion. The internal opening 52 defined by the pin retainer 40 opens through both of the opposed ends of the pin retainer such that optical fibers can extend through the pin retainer and into the internal cavities 32, 28 defined by the second and first shoulder portions 18, 16, respectively, and the bores 22 defined by the shank 14. The pin retainer 40 of this embodiment also includes a plurality and, more typically, a pair of tabs 54 extending into the internal opening 52 defined by the pin retainer 40 for engaging the circumferential grooves 42 of respective guide pins 30. Accordingly, the pin retainer 40 of this embodiment can also securely engage the guide pins 30 and affix the guide pins in position relative to the ferrule 12. While the alternative pin retainer 40 depicted in FIGS. 7 and 8 includes a rearward portion 56 having a smaller cross-sectional size that is positioned immediately rearward of the ferrule 12, the pin retainer need not include the rearward portion, but can, instead, include only that portion that extends about the second shoulder portion 18 of the ferrule to reduce the combined length of the ferrule and the pin retainer, if so desired. In any event, however, the pin retainer 40 of this alternative embodiment does not extend laterally outward beyond the first shoulder portion 16.

In another embodiment illustrated in FIG. 9, the pin retainer 40 can include a plurality of retaining tabs 58 for engaging respective guide pins 30 that extend along the exterior surface of the second shoulder portion 18. The pin retainer 40 of this embodiment also includes a frame 60 connecting the plurality of tabs 58. The frame 60 defines an opening for receiving the second shoulder portion 18 such that the frame can be mounted over the second shoulder portion and the tabs 58 can engage the circumferential grooves 42 of respective guide pins 30. However, the frame 60 is advantageously no larger in lateral cross-section than the first shoulder portion 16 of the ferrule 12. Moreover, the generally planar pin retainer 40 of this embodiment does not extend rearward of the ferrule 12, thereby permitting the ferrule to be lengthened, if desired, in relation to a conventional MT ferrule.

As described above, the multi-fiber ferrule 12 of the present invention is compatible with a variety of conventional ferrules including mini-MT ferrules and E-ferrules and, if sized properly, standard MT ferrules. As such, a fiber optic connector that includes the multi-fiber ferrule 12 can include a wide variety of other components. For example, the multi-fiber ferrule 12 and the pin retainer 40 of the embodiment depicted in FIGS. 3–5 can be readily assembled into an MT-RJ connector or a UniCam® connector, as described in the related co-pending U.S. patent application Ser. No. 09/878,566, now U.S. Pat. No. 6,669,377. As will apparent to those skilled in the art, the multi-fiber ferrule 12 and pin retainer 40 of the present invention can also be embodied within an MTP connector in much the same fashion as described therein in conjunction with the MT-RJ connector, although the standard-sized MT ferrule will be larger than the mini-MT ferrule. In particular, the embodiment of the pin retainer 40 depicted in FIG. 9 can be readily assembled onto the rearward end of a standard sized MT ferrule in a conventional MTP connector, for example between the ferrule and the spring push. It would be preferable, as previously mentioned, that the pin retainer 40 not extend rearward of the ferrule. Furthermore, the pin retainer 40 depicted in FIG. 9 must be molded from a plastic material or stamped from a metal material, each of which is relatively labor intensive and time consuming, and thus, an inefficient method of fabricating the pin retainer.

Figure 11:
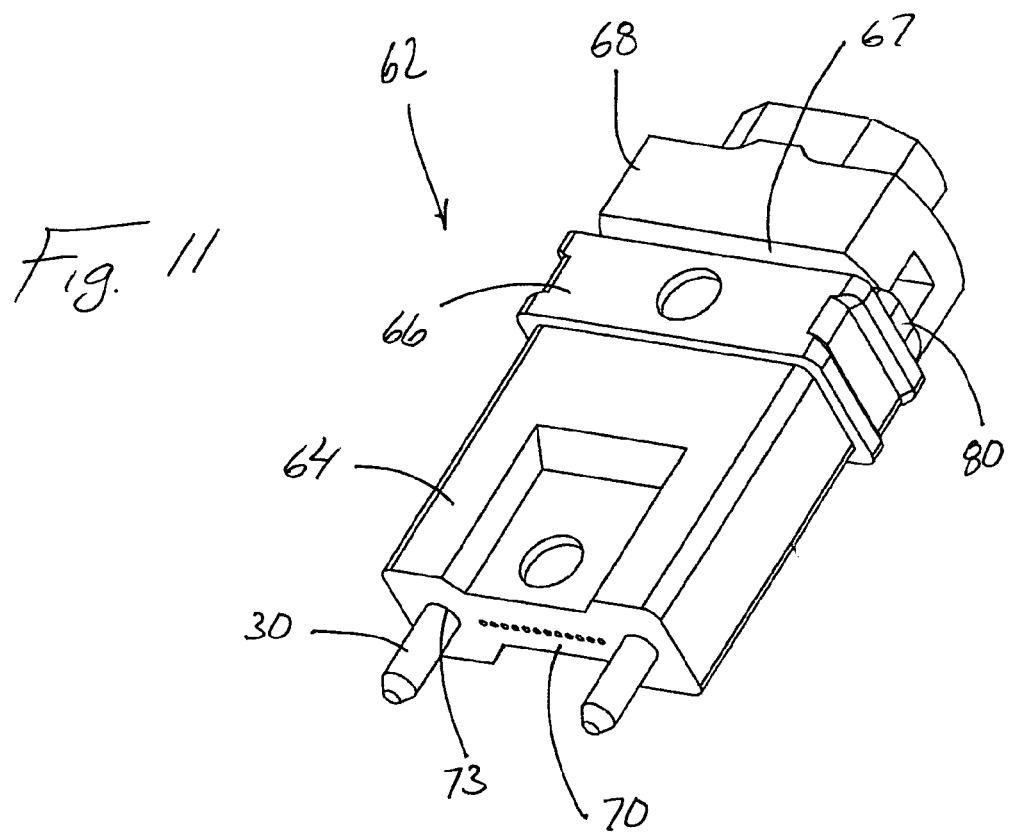
FIG. 11 is a perspective view of a ferrule for receiving the pin retainer of FIG. 10.
Figure 12:
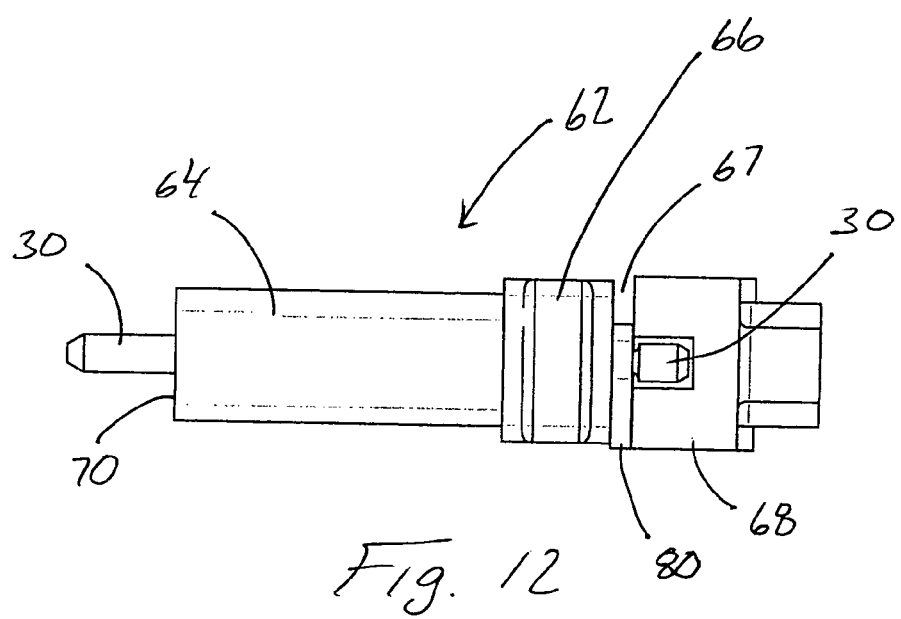
FIG. 12 is a side view of the ferrule and the pin retainer of FIG. 11.

FIG. 10 illustrates a guide pin retainer 80 according to yet another embodiment of the present invention. The pin retainer 80 is generally planar and C-shaped, and as such, is generally referred to as a "C-clamp" or "C-clip" style pin retainer. The C-clip pin retainer 80 has certain advantages relative to the pin retainer 40 depicted in FIG. 9. For example, the pin retainer 80 comprises a frame 82 that is open on one side to permit the pin retainer to be inserted onto a standard-sized MT ferrule 62, preferably between the first shoulder portion 66 and the second shoulder portion 68, as shown in FIGS. 11 and 12. In particular, a peripheral groove 67 may be formed, such as by machining, but preferably by molding, adjacent the rearward end of the first shoulder portion 66 and the forward end of the second shoulder portion 68. The C-clip pin retainer 80 can then be inserted onto the ferrule 62 prior to assembly of the fiber optic connector and polishing of the front face 70 of the ferrule 62. Thus, the fiber optic connector can be manufactured in a female configuration and the guide pins 30 may be inserted into the holes 73 defined by the shank 64 of the ferrule 62 in the field to convert the fiber optic connector into a male configuration. As the guide pins 30 are inserted from the front face 70 of the ferrule 62 through the shank 64 and the first shoulder portion 66, the tapered end portions of the guide pins engage the frame 82 of the pin retainer 80. The end portions of the guide pins 30 cause the frame 82 of the pin retainer 80 to flex outwardly until the circumferential grooves 42 of the respective guide pins 30 are seated within the semi-circular retaining tabs 84 defined by the frame. Because the frame 82 is open on one side and flexes outwardly, the pin retainer 80 requires minimal guide pin insertion force relative to the pin retainer 40. However, the pin retainer 80 is preferably sized and configured to provide a pin retention force (i.e., pull-out strength) of at least about 8 lbs., and more preferably, of at least about 10 lbs. The open side of the pin retainer 80 also offers the capability of providing a mechanism for releasing the guide pins 30 from the pin retainer 80 in the event that pin removal or pin replacement is necessary. Advantageously, the mechanism for releasing the guide pins 30 could be activated using an external tool following assembly of the connector, polishing of the front face 70 of the ferrule 62, and insertion of the guide pins. The frame 82 is advantageously no larger in lateral cross-section than the first shoulder portion 66 of the ferrule 62. Moreover, the generally planar pin retainer 80 of this embodiment does not extend rearward of the ferrule 62, thereby permitting the ferrule to be lengthened, if desired, in relation to a conventional MT ferrule.

The open frame 82 of the pin retainer 80 further permits the pin retainer to be fabricated from metal using a wire electrical discharge machining (EDM) process rather than a conventional stamping process. The wire EDM fabrication process produces relatively sharp edges on both sides of the part as compared to the stamping process which tends to produce rounded edges on one side of the part. As a result, a plurality of sheets of thin gauge metal stock can be stacked together to simultaneously produce a corresponding plurality of exceptional quality pin retainers 80 in a highly efficient manner. Because the C-clip pin retainer 80 has an open side, the cutting wire can enter and exit the pin retainer without the need to disengage and relocate the wire inside the frame 82 of the pin retainer. Accordingly, the wire EDM process can be programmed to operate continuously over an extended period of time to further efficiently fabricate a large number of pin retainers 80 with little or no operator attention.

Figure 13:
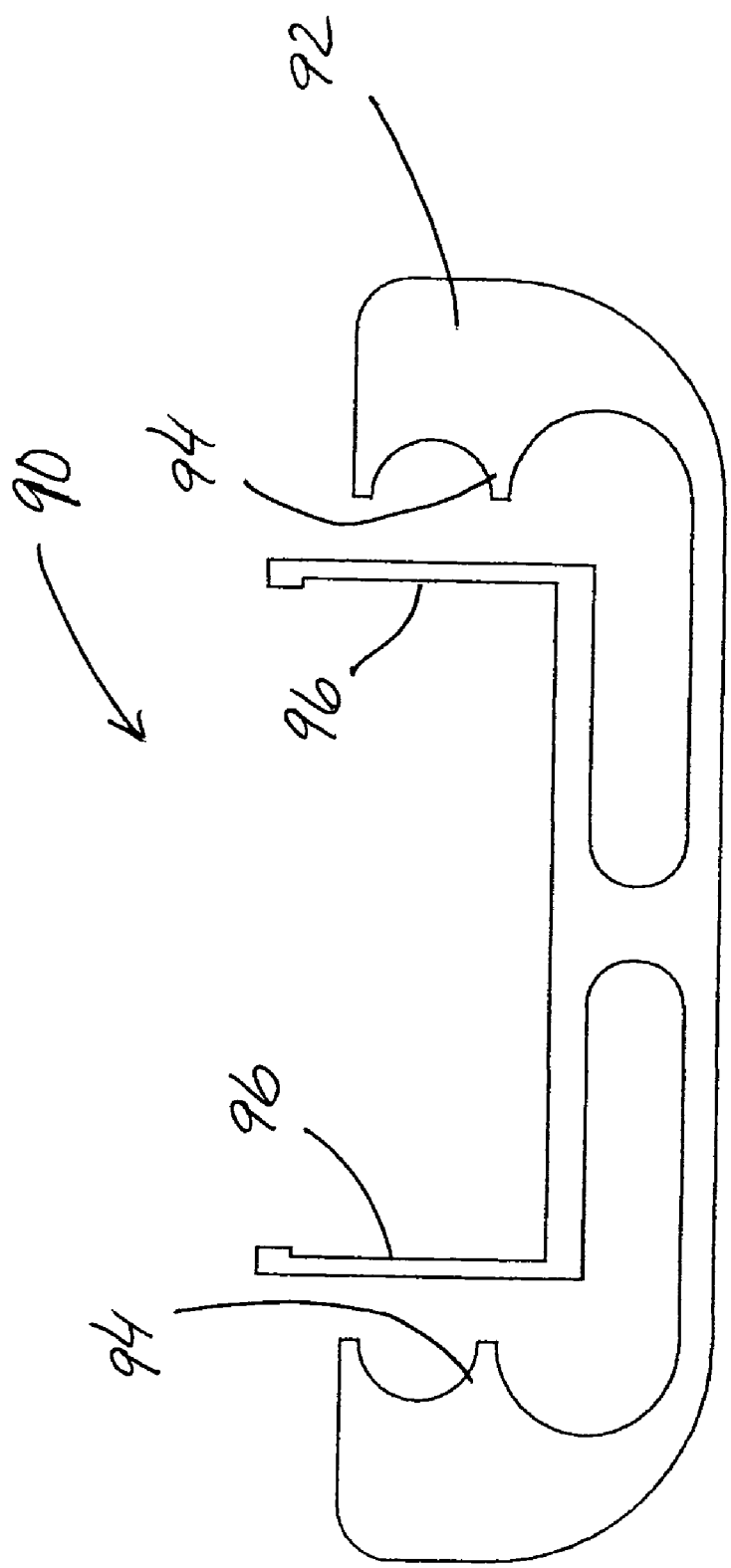
FIG. 13 is an enlarged plan view of a pin retainer according to yet another embodiment of the present invention.

Similar to the retaining tabs 58 provided on the closed-frame pin retainer 40, the semi-circular retaining tabs 84 provided on the C-clip pin retainer 80 are asymmetrical in that they engage the guide pins 30 on only one side. As a result, the guide pin retention force generated by the C-clip pin retainer 80 is merely equal, or only marginally superior, to the guide pin retention force generated by the closed-frame pin retainer 40. FIG. 13 illustrates an alternative C-clip pin retainer 90 according to yet another embodiment of the present invention. The generally planar C-clip pin retainer 90 includes an open frame 92 comprising a pair of centrally disposed flexure arms 96 positioned opposite semi-circular retaining tabs 94. The flexure arms 96 may be sized and shaped to receive a reduced diameter provided on the first shoulder portion 66 or the second shoulder portion 68 of the ferrule 62, and cooperate with the retaining tabs 94 to engage the end portions of the guide pins 30 on both sides. Thus, the circumferential grooves 42 of the guide pins 30 are retained within the pin retainer 90 between the retaining tabs 94 and the flexure arms 96. As a result, the pin retention force generated by the C-clip pin retainer 90 is superior to the pin retention force generated by either the closed-frame pin retainer 40 or the C-clip pin retainer 80 previously described.

Figure 14:
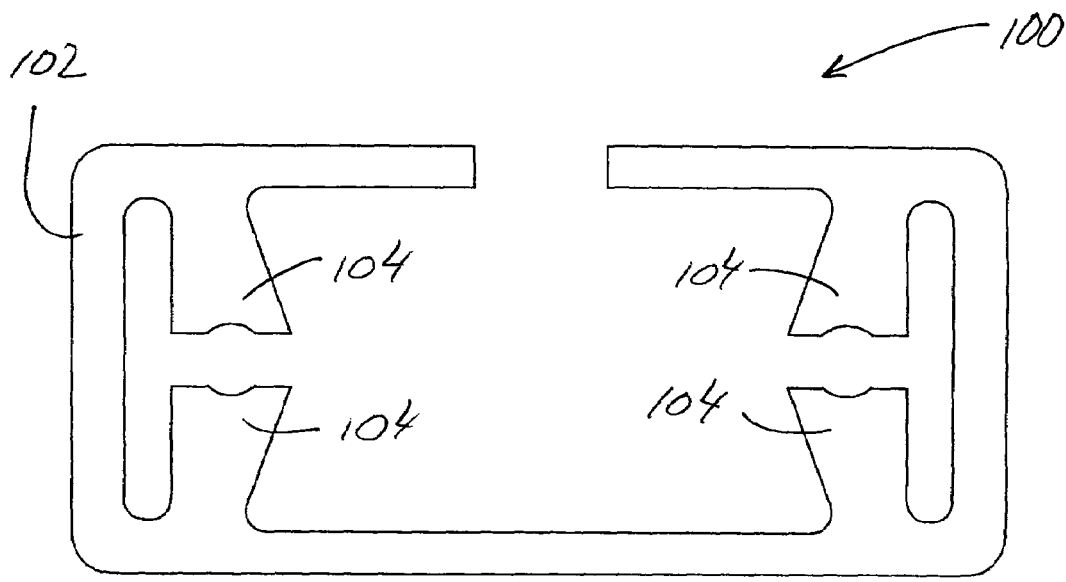
FIG. 14 is an enlarged plan view of a pin retainer according to yet another embodiment of the present invention.

FIG. 14 illustrates a pin retainer 100 according to yet another embodiment of the present invention. The pin retainer 100 is generally planar and E-shaped, and as such, is generally referred to as an "E-clamp" or "E-clip" style pin retainer. The E-clip pin retainer 100 has certain advantages relative to the pin retainer 40 depicted in FIG. 9 and the C-clip pin retainer 80 depicted in FIGS. 10–12. In particular, the pin retainer 100 comprises a planar frame 102 that is configured to generate a truly symmetrical guide pin retention force. The frame 102 is open on one side to permit the pin retainer to be inserted onto a standard-sized MT ferrule 62, preferably between the first shoulder portion 66 and the second shoulder portion 68, as previously described and shown in FIGS. 11 and 12, and to further permit highly efficient fabrication by a wire EDM process, as previously described. The frame 102 includes a plurality of retaining tabs 104 that are positioned opposite one another on the closed and open sides of the frame 102. The retaining tabs 104 engage the end portions of the guide pins 30 as the guide pins are inserted from the front face 70 of the ferrule 62 through the holes 73 and the first shoulder portion 66 into the second shoulder portion 68. The tapered end portions of the guide pins 30 cause the open side of the frame 102 to flex outwardly until the circumferential grooves 42 of the respective guide pins 30 are seated within between the pairs of semi-circular retaining tabs 104 defined by the frame. As a result, the pin retention force generated by the E-clip pin retainer 100 is superior to the pin retention force generated by either the closed-frame pin retainer 40 or the C-clip pin retainers 80, 90 previously described. The frame 102 is advantageously no larger in lateral cross-section than the first shoulder portion 66 of the ferrule 62. Moreover, the generally planar pin retainer 100 of this embodiment does not extend rearward of the ferrule 62, thereby permitting the ferrule to be lengthened, if desired, in relation to a conventional MT ferrule.

Figure 15:
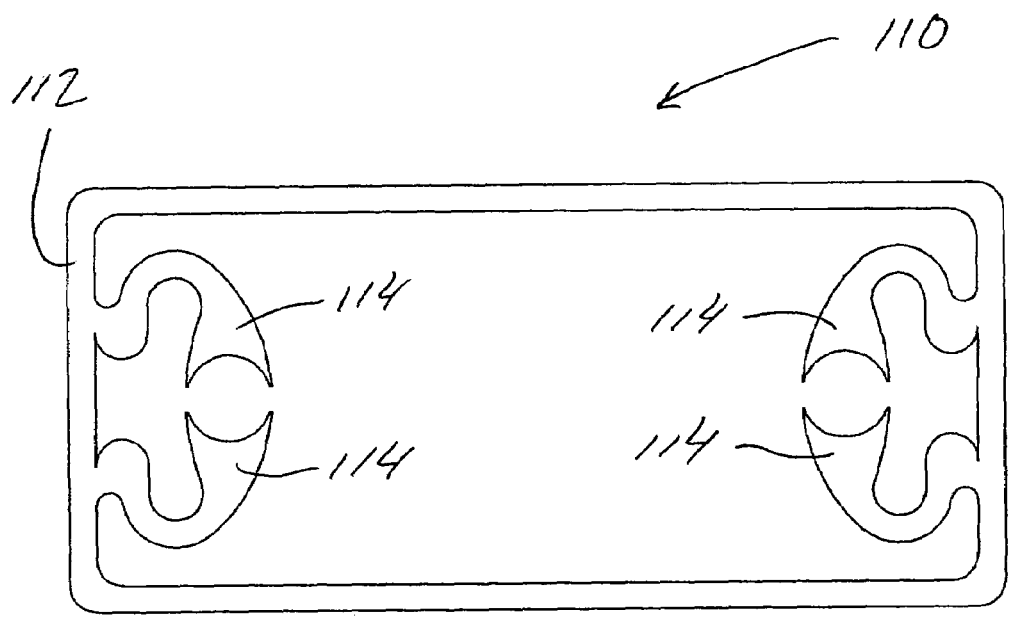
FIG. 15 is an enlarged plan view of a pin retainer according to yet another embodiment of the present invention.
Figure 16:
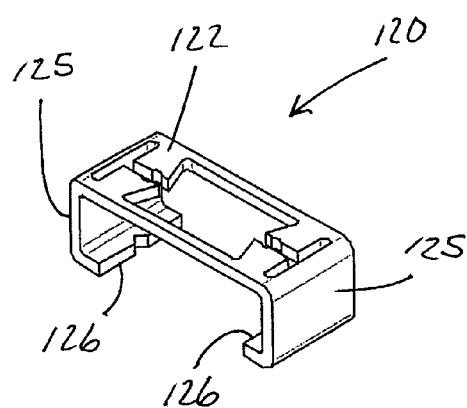
FIG. 16 is a perspective view of a pin retainer according to yet another embodiment of the present invention.

FIG. 15 illustrates an alternative pin retainer 110 according to yet another embodiment of the present invention. The pin retainer 110 is generally planar and E-shaped, and as such, is generally referred to as an "E-clamp" or "E-clip" style pin retainer. The E-clip pin retainer 110 is substantially similar to the E-clip pin retainer 100 previously described except that the pin retainer 110 includes a closed frame 112, and thus, does not lend itself to the highly efficient wire EDM fabrication process previously described. However, it is anticipated that the pin retainer 110 would generate a pin retention force superior to any of the pin retainers 40, 80, 90, 100 previously described since the pairs of retaining tabs 114 are integral with the frame 102 that is closed on both sides.

Figure 17:
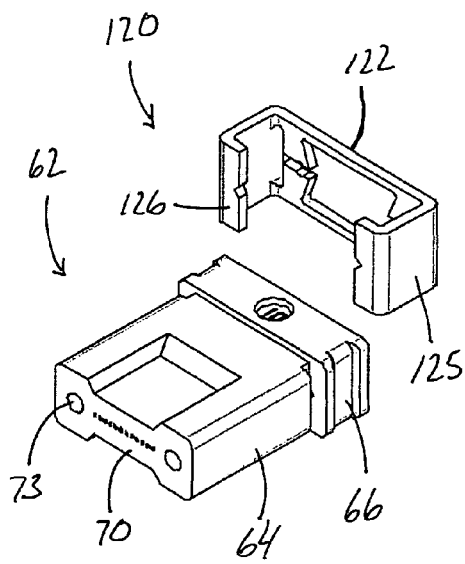
FIG. 17 is an exploded perspective view of a ferrule for receiving the pin retainer of FIG. 16 and the pin retainer.
Figure 18:
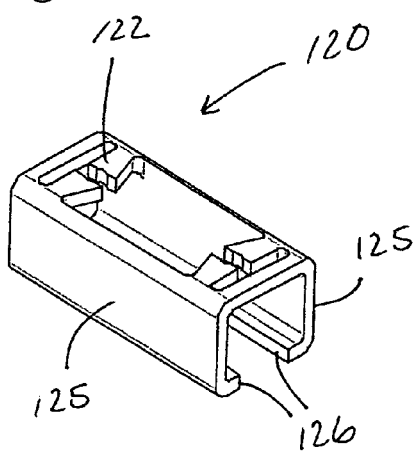
FIG. 18 is a perspective view of a pin retainer according to yet another embodiment of the present invention.
Figure 19:
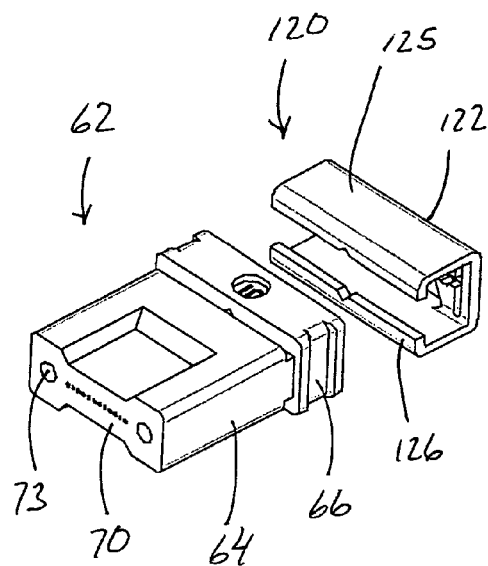
FIG. 19 is an exploded perspective view of a ferrule for receiving the pin retainer of FIG. 16 and the pin retainer.

FIGS. 16–19 illustrate alternative pin retainers 120 according to yet another embodiment of the present invention. The pin retainers 120 are three-dimensional and comprise a generally E-shaped rear face 122. As such, the pin retainers 120 are generally referred to as a "three-dimensional E-clamp" or "three-dimensional E-clip" style pin retainers. The three-dimensional E-clip pin retainers 120 are substantially similar to the E-clip pin retainer 110 previously described except that each pin retainer 120 is fabricated from a stamped metal part that is bent to form a generally C-shaped channel comprising a rear face 122, a pair of outer walls 125 depending forwardly from the rear face and a pair of opposed forward edges 126 depending inwardly from the outer walls 125. As shown in FIG. 17, the forward edges 125 engage an external feature provided on the ferrule 62 between the shank 64 and the first shoulder portion 66 such that the rear face 122 is positioned rearwardly of the first shoulder portion adjacent the lengthwise opening (not shown) defined by the first shoulder portion. The external feature may be machined, but preferably is molded, on the exterior surface of the ferrule 62 in a conventional manner. Accordingly, each pin retainers 120 of this embodiment can also securely engage the guide pins 30 and affix the guide pins in position relative to the ferrule 62. Furthermore, the guide pins 30 can be inserted into the pin retainer 120 following assembly of the connector and polishing of the front face 70 of the ferrule 62 in the manner previously described to convert a fiber optic connector including the pin retainer 120 from a female configuration to a male configuration in the field.

As the foregoing embodiments illustrate, various embodiments of a pin retainer are provided for a fiber optic connector that permit guide pins to be inserted into the guide pin holes provided on the ferrule following assembly of the connector and polishing of the front face of the ferrule. In each embodiment, the pin retainer is not larger, or significantly larger, in lateral cross section than the first shoulder portion of the ferrule and does not extend rearward, or significantly rearward, of the ferrule. Furthermore, certain of the embodiments shown and described herein generate a pin retention force that preferably exceeds at least about 8 lbs, and more preferably, exceeds at least about 10 lbs. Still further, certain of the embodiments disclosed herein lend themselves to a highly efficient wire EDM fabrication process that permits large quantities of generally planar pin retainers to be produced in an automated manufacturing environment with little or no operator involvement.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A pin retainer for a fiber optic connector including a ferrule having a front face defining at least one lengthwise hole for receiving a guide pin, the ferrule comprising a shank, a first shoulder portion rearward of the shank and a second shoulder portion rearward of the first shoulder portion and wherein the lateral cross-section of the frame is no larger than the lateral cross-section of the first shoulder portion, the pin retainer comprising:
    a generally planar frame defining an opening for positioning the pin retainer on the ferrule such that the frame is generally parallel to the front face; and
    at least one retaining tab extending inwardly from the frame for engaging the guide pin when the guide pin is inserted into the hole from the front face following assembly of the fiber optic connector and polishing of the front face of the ferrule.

2. A pin retainer according to claim 1, wherein the guide pin is inserted into the hole to convert a fiber optic connector having a female configuration into fiber a optic connector having a male configuration.

3. A pin retainer according to claim 1, wherein the pin retainer does not protrude rearward beyond the ferrule.

4. A pin retainer according to claim 1, wherein the frame is open on one side and is generally C-shaped so as to define a C-clip that is configured to be positioned on an external feature provided on the ferrule and the C-clip can be flexed to remove the guide pin.

5. A pin retainer according to claim 1, wherein the frame is open on one side and is generally E-shaped so as to define an E-clip that is configured to be positioned on an external feature provided on the ferrule.

6. A pin retainer according to claim 1, wherein the frame is open on one side and is generally E-shaped so as to define an E-clip and comprises at least a pair of retaining tabs such that the pin retainer engages the guide pin symmetrically on opposite sides of the guide pin.

7. A pin retainer according to claim 6, wherein the pair of retaining tabs are received within a circumferential groove provide on the guide pin when the guide pin is inserted into the ferrule.

8. A pin retainer according to claim 1, wherein the frame and the at least one retaining tab generate a pin retention force of at least about 8 lbs.

9. A pin retainer for a fiber optic connector including a ferrule having a front face defining at least one lengthwise hole for receiving a guide pin, the ferrule comprising a shank, a first shoulder portion rearward of the shank and a second shoulder portion rearward of the first shoulder portion and wherein the pin retainer is positioned on the ferrule between the first shoulder portion and the second shoulder portion, the pin retainer comprising:
    a generally planar frame defining an opening for positioning the pin retainer on the ferrule such that the frame is generally parallel to the front face; and
    at least one retaining tab extending inwardly from the frame for engaging the guide pin when the guide pin is inserted into the hole from the front face following assembly of the fiber optic connector and polishing of the front face of the ferrule.

10. A pin retainer for a fiber optic connector including a ferrule having a front face defining at least one lengthwise hole for receiving a guide pin, the pin retainer comprising;
    a generally planar frame defining an opening for positioning the pin retainer on the ferrule such that the frame is generally parallel to the front face; and
    at least one retaining tab extending inwardly from the frame for engaging the guide pin when the guide pin is inserted into the hole from the front face following assembly of the fiber optic connector and polishing of the front face of the ferrule;
    wherein the frame is open on one side and is generally C-shaped so as to define a C-clip and comprises at least one flexure arm opposite the at least one retaining tab such that the pin retainer engages the guide pin in more than one location.

11. A pin retainer according to claim 10, wherein the at least one retaining tab and the at least one flexure arm are received within a circumferential groove provided on the guide pin when the guide pin is inserted into the ferrule.

12. A pin retainer for engaging at least one guide pin inserted into a ferrule having a front face defining a hole for receiving the guide pin, the pin retainer comprising:
   a generally planar frame; and
   at least one retaining tab extending inwardly from the frame for engaging the guide pin when the guide pin is inserted into the hole from the front face;
   wherein the frame is open on one side to permit the pin retainer to be fabricated by a wire electrical discharge machining (EDM) process in a continuous manner without the need to disengage and relocate the wire inside the frame of the pin retainer.

13. A pin retainer according to claim 12, wherein the frame is generally C-shaped so as to define a C-clip that is configured to be positioned on an external feature provided on the ferrule.

14. A pin retainer according to claim 13, wherein the frame comprises at least one flexure arm opposite the at least one retaining tab such that the pin retainer engages the guide pin in more than one location and wherein the retaining tab and the flexure arm are received within a circumferential groove provided on the guide pin.

15. A pin retainer according to claim 12, wherein the frame is generally E-shaped so as to define an E-clip that is configured to be positioned on an external feature provided on the ferrule.

16. A pin retainer according to claim 15, wherein the frame comprises at least a pair of retaining tabs such that the pin retainer engages the guide pin symmetrically on opposite sides of the guide pin and wherein the pair of retaining tabs are received within a circumferential groove provided on the guide pin.

17. A pin retainer for engaging at least one guide pin inserted into a ferrule having a front face defining a hole for receiving the guide pin, the pin retainer comprising:
   a generally planar frame;
   at least one retaining tab extending inwardly from the frame for engaging the guide pin when the guide pin is inserted into the hole from the front face; and
   at least one flexure arm opposite the at least one retaining tab such that the pin retainer engages the guide pin in more than one location;
   wherein the retaining tab and the flexure arm are received within a circumferential groove provided on the guide pin; and
   wherein the frame, the flexure arm and the retaining tab generate a pin retention force of at least about 8 lbs.

18. A pin retainer according to claim 17, wherein the frame, the flexure arm and the retaining tab generate a pin retention force of at least about 10 lbs.

19. A pin retainer according to claim 17, wherein the frame is generally C-shaped so as to define a C-clip that is configured to be positioned on an external feature provided on the ferrule.

20. A pin retainer according to claim 17, wherein the frame is generally E-shaped so as to define an E-clip that is configured to be positioned on an external feature provided on the ferrule.

21. A pin retainer according to claim 20, wherein the frame comprises at least a pair of retaining tabs such that the pin retainer engages the guide pins symmetrically on opposite sides of the guide pin and wherein the pair of retaining tabs are received within a circumferential groove provided on the guide pin.

22. A pin retainer for engaging at least one guide pin inserted into a ferrule having a front face defining a hole for receiving the guide pin, the ferrule comprising a shank, a first shoulder portion rearward of the shank and a second shoulder portion rearward of the first shoulder portion, the pin retainer comprising:
   a frame; and
   at least one retaining tab extending inwardly from the frame for engaging the guide pin when the guide pin is inserted into the hole from the front face;
   wherein the ferrule is provided with an external feature for receiving the frame to position the pin retainer on the ferrule, the external feature comprising a groove formed in the periphery of the ferrule adjacent the first shoulder portion and the second shoulder portion.

23. A pin retainer according to claim 22, wherein the external feature is molded onto the ferrule.

24. A fiber optic connector comprising:
   a ferrule comprising
      a shank defining a plurality of lengthwise extending bores for receiving end portions of respective optical fibers, the shank having a front face defining at least one lengthwise extending hole for receiving a respective guide pin;
      a first shoulder portion disposed rearward of the shank, the first shoulder portion being larger in lateral cross-section than the shank, the first shoulder portion also defining a lengthwise extending opening for receiving the respective guide pin; and
      a second shoulder disposed rearward of the first shoulder portion, the second shoulder portion being smaller in lateral cross-section than the first shoulder portion; and
   a pin retainer comprising
      a frame defining an opening for positioning the pin retainer on the ferrule; and
      at least one retaining tab extending inwardly from the frame for engaging the guide pin when the guide pin is inserted into the lengthwise extending hole of the shank and the lengthwise extending opening of the first shoulder portion from the front face hole to convert the fiber optic connector from a female configuration into a male configuration.

25. A fiber optic connector according to claim 24, wherein the frame of the pin retainer is generally C-shaped so as to define a C-clip that is configured to be positioned on an external feature provided on the ferrule.

26. A fiber optic connector according to claim 24, wherein the frame of the pin retainer is generally E-shaped so as to define an E-clip that is configured to be positioned on an external feature provided on the ferrule.

27. A fiber optic connector according to claim 24, wherein the frame and the retaining tab generate a pin retention force of at least about 8 lbs.

28. A fiber optic connector according to claim 24, wherein the ferrule is provided wit an external feature for receiving the frame to position the pin retainer on the ferrule.

* * * * *